United States Patent [19]
Mann et al.

[11] Patent Number: 5,964,022
[45] Date of Patent: Oct. 12, 1999

[54] METHOD OF JOINING BRAKE ASSEMBLIES TO WHEEL HUBS

[75] Inventors: David Maurice Mann, Wolverine Lake; George Abram Thornton, Canton, both of Mich.

[73] Assignee: Ford Global Technologies, Inc., Dearborn, Mich.

[21] Appl. No.: 08/999,081

[22] Filed: Dec. 29, 1997

[51] Int. Cl.$^6$ ............................................. B23P 25/00
[52] U.S. Cl. ................................. 29/458; 188/218 XL
[58] Field of Search ................... 188/218 XL; 29/458

[56] References Cited

U.S. PATENT DOCUMENTS

| | | | |
|---|---|---|---|
| 3,630,323 | 12/1971 | Hickle . | |
| 4,180,622 | 12/1979 | Burkhard et al. | 428/564 |
| 4,643,648 | 2/1987 | Huller | 416/241 B |
| 5,108,156 | 4/1992 | Bell . | |
| 5,194,304 | 3/1993 | McCune, Jr. et al. | 427/449 |
| 5,407,035 | 4/1995 | Cole et al. | 188/218 |
| 5,526,914 | 6/1996 | Dwivedi | 192/107 M |
| 5,569,496 | 10/1996 | Wei et al. . | |
| 5,686,144 | 11/1997 | Thebault et al. | 427/282 |

Primary Examiner—S. Thomas Hughes
Assistant Examiner—Steven A Blount
Attorney, Agent, or Firm—Joseph W. Malleck

[57] ABSTRACT

Method of mounting a brake rotor to a wheel hub, the mounting establishing a sealed but removable fixed bearing therebetween; it comprises the steps of: (a) forming mating metallic mounting surfaces on the respective rotor and hub that at least in part extend in a plane normal to the axis of rotation of the hub (for example, within a tolerance ±0.001 inch); (b) depositing a sealing material between the mounting surfaces consisting of a mineral oil based paste containing generally similar proportions by volume of particles of nickel, graphite and a hydrocarbon, suspended in the paste, the particles having an ultra fine particle size in the range of 5–80 microns; (c) clamping the surfaces together to complete the mounting, the clamping causing the deposited material to spread uniformly therebetween to seal the surfaces against corrosion, the paste being deposited in a limited volume to permit metal to metal contact between micro ridges of the surfaces when clamped, the uniformly spread material tolerating micromovements between the surfaces during extended use without fretting to thereby maintain alignment of the rotor to the hub within the designed tolerance.

12 Claims, 6 Drawing Sheets

5,964,022

METHOD OF JOINING BRAKE ASSEMBLIES TO WHEEL HUBS

BACKGROUND OF THE INVENTION

1. Technical Field

This invention relates to the technology of mounting wheels with a braking assembly, and in particular, to techniques for eliminating dis-alignment that may develop between the wheel hub and the braking element of the braking assembly, sometimes called lateral run-out, which may cause pulsation of the brake pedal when applied or may cause undue brake wear.

2. Discussion of the Prior Art

It has become common practice to delete tapered roller bearing packs at the connection between hubs and braking elements (i.e. a cast hollow rotor plate) and substitute a metal surface to surface flange mount of the braking element to the hub inner-hat flange. The braking element or rotor is designed to operate in a precise plane normal to the axis of the wheel; there is little tolerance for deviation of such plane which deviation must generally be no greater than 0.001 inch at the rotor outer diameter to avoid lateral run-out. To assure such alignment, the mating flange surfaces of the mount are machined to very high accuracy and, when brought together under the coupling force of threaded fasteners, will achieve such alignment. The braking caliper that operates on such rotor, depends on the rotor remaining in the designed rotational plane relative to the wheel axis for the caliper brake pads to operate with a predetermined movement. If not, the brake pedal feel will be different and the driver will sense pulsating contact by the brake pads as the skewed rotor wobbles between the pair of brake pads.

Such dis-alignment can readily arise from the presence of corrosion between the mating mounting surfaces. Corrosion will appear as discontinuous non-uniform particles that may force the flanges apart as little as point 0.0005 inches to create some degree of lateral rotor run-out. This is as little as a 0.01% deviation of the rotor outer diameter from its intended rotational plane. Such run-out creates an apparent cycle of contact and non-contact between the rotor and a brake pad while the wheel is rotating even without the brakes being applied. The driver interprets this as braking system roughness (pedal pulsation) or a sense of steering wheel shake, both feelings occurring when braking is applied at vehicle speeds of around 30–70 mph.

The obvious attempt to solve this problem is to apply a coating to the metal (i.e., steel) mounting surfaces that would inhibit corrosion. Unfortunately, introducing typically obvious materials to the assembly results in either (i) the material being too easily removed or migrated during normal micro shifting of the hub and rotor flanges when load and under centrifugal stress, or (ii) the material becomes too hard and frets under use resulting again in uneven distribution of the coating which becomes equivalent to a disturbance like corrosion. In either case there is progressive evolution of discontinuity between the mating surfaces on a microscopic scale resulting in lateral rotor run-out. Fretting of the coatings, that eventually become hard, is due to microscopic movement of the two mating surfaces during use that grinds the coating or the material may become unstable at temperatures such as 300–600° F. to locally become patchy.

SUMMARY OF THE INVENTION

It is an object of this invention to provide a method of assembling wheels with braking rotors that seal the assembly against corrosion without permitting fretting or modification of the sealing material in use that may lead to rotor disalignment-alignment, such sealing eliminating long-term corrosion and permitting removal and reassemble of the wheel without contamination from particulates or corrosion which may promote lateral run-out when reassembled.

The invention which meets the above object, comprises a method of mounting a brake rotor to a wheel hub, the mounting establishing a sealed but removable fixed bearing therebetween, comprising the steps of: (a) forming mating metallic mounting surfaces on said respective rotor and hub that at least in part extend in a plane normal to the axis of rotation of the hub (for example, within a tolerance ±0.001 inch); (b) depositing a sealing material between the mounting surfaces consisting of a mineral oil based paste containing generally similar proportions by volume of particles of nickel, graphite and a hydrocarbon, suspended in the paste, said particles having an ultra fine particle size range of 5–80 microns; (c) clamping said surfaces together to complete the mounting, the clamping causing the deposited material to spread uniformly therebetween to seal the surfaces against corrosion, the paste being deposited in a limited volume to permit metal to metal contact between micro ridges of the surfaces when clamped, said uniformly spread material tolerating micromovements between the surfaces during extended use without fretting to thereby maintain alignment of the rotor to the hub within the designed tolerance.

DETAILED DESCRIPTION AND BEST MODE

Figure 1:
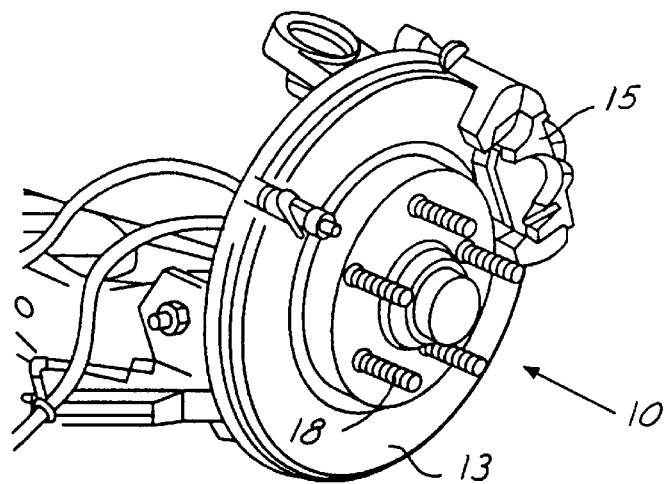
FIG. 1 is a general perspective view of a wheel assembly showing the rotor in place with braking calipers properly installed.
Figure 2:
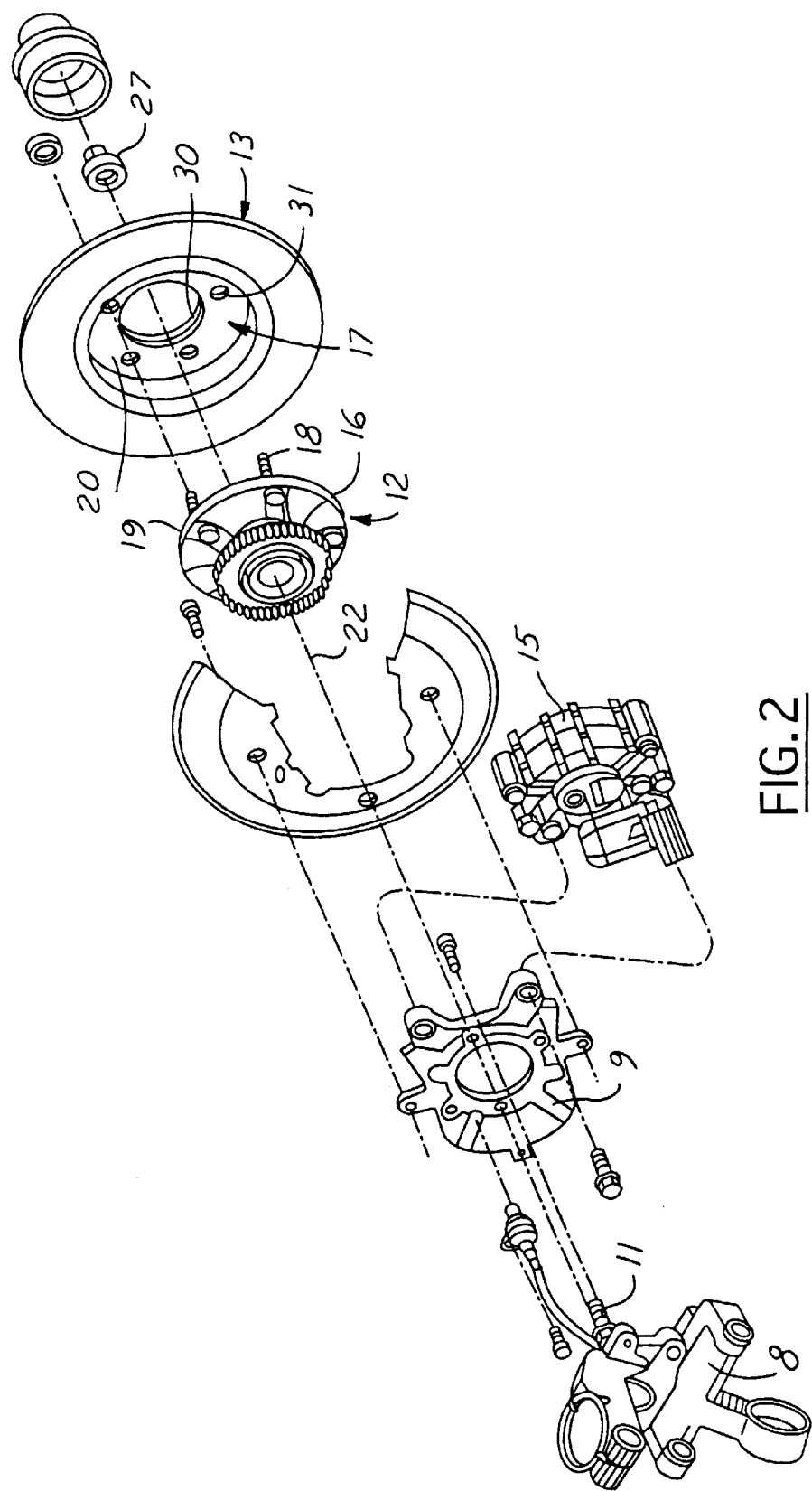
FIG. 2 is an exploded perspective view of the elements of FIG. 1 taken from a reverse direction.
Figures 3, 6:
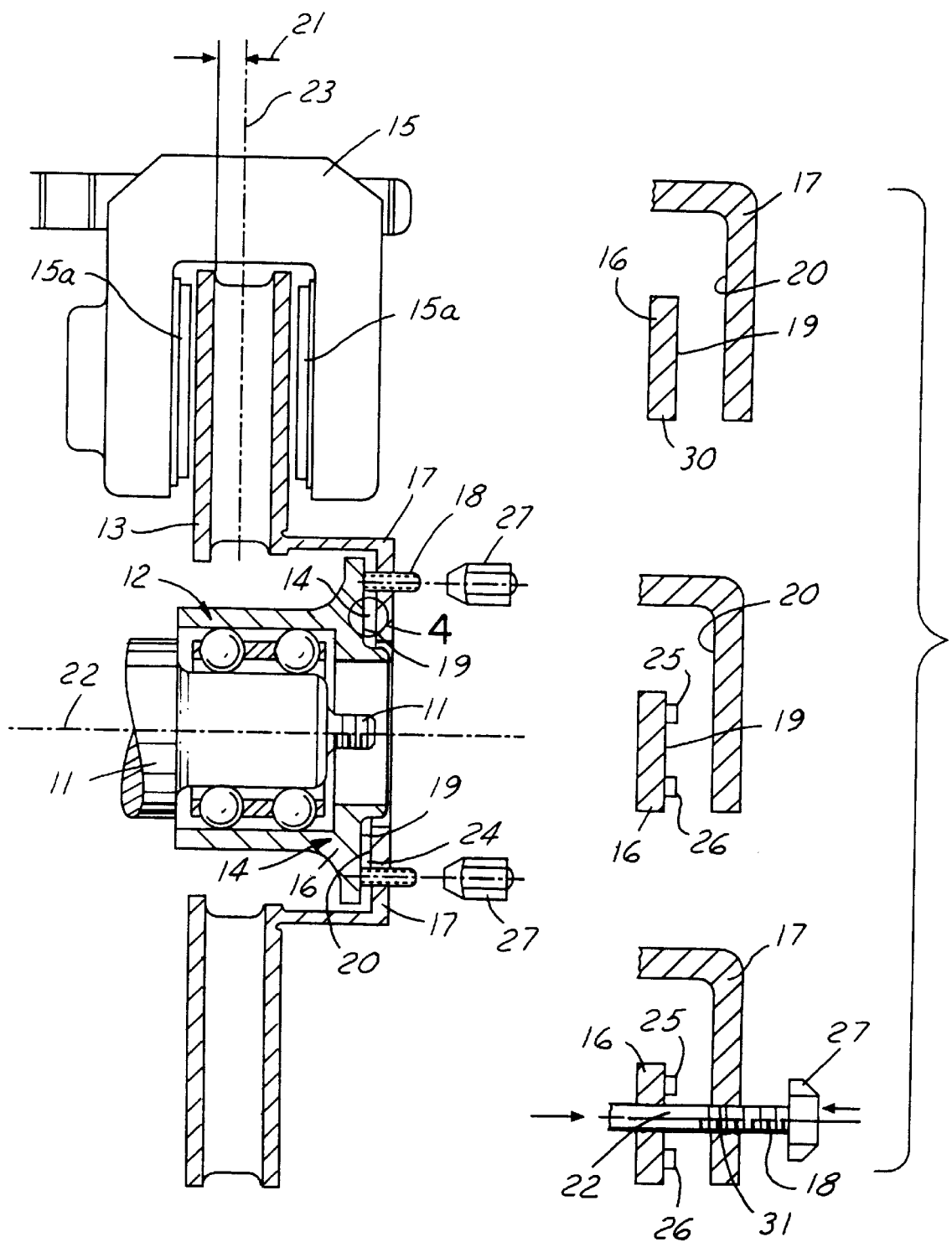
FIG. 3 is an enlarged sectional view taken substantially along line 3—3 of FIG. 1.
FIG. 6 is a composite view of diagrammatic steps of the process of this invention.

As shown in FIGS. 1–2, wheel assembly 10, employing disc braking, comprises a wheel spindle 11, a hub 12 on the spindle, a rotor 13 attached at 14 to the hub 12 and a braking caliper 15 (containing disc brake pads 15a) is supported on bracket 15 secured to the steering knuckle 8 carrying spindle 11; the braking pads of caliper 15 the rotor as illustrated in FIG. 3. The rotor 13 is mounted to hub 12 by coupling a flat annular steel flange 16 of the hub to a flat annular steel or aluminum rotor flange 17 of the rotor by use of fastened studs 18 or bolts.

Corrosion will form on the unprotected coupled interfaces 19, 20 of the flanges over extended vehicular use, resulting from the presence of moisture, air and temperature cycling from braking (heating) and subsequent cooling; such corrosion can originate at or migrate and creep between such interfaces 19, 20 even though clamped by the fastened studs. The interfacing surfaces 19, 20 are machined to be flat and parallel to each other within about 0.002 inches and have a smooth surface finish of about 15–80 micro inches. It is the presence of corrosion on such interfacing surfaces that leads to lateral rotor run-out 21 (a side-to-side movement or wobble of the rotor as it rotates about the spindle axis 22 which can cause vibration, brake pedal pumping or brake chatter associated with the caliper that must engage the rotor). Lateral rotor run-out 21 need not be great to be troublesome; for example, it preferably should not exceed 0.0005 inches, measured at the outermost diameter of the rotor, to avoid being troublesome. Furthermore, corrosion can effect rotor run-out for wheel assemblies that have had the rotor removed exposing the interfacing surfaces 19, 20. Particles of corrosion can fall off or be dislodged so that the mating surfaces 19, 20, when reassembled, will be more skewed on a micro-scale than before disassembly.

This invention overcomes such problems related to corrosion. The interfacing surfaces 19, 20 are formed with a micro finish of 30–60 micro inches and are carried in a predetermined position perpendicular to the spindle axis 22 so that the rotor/hub assembly will rotate in a plane 23 that has no run-out from such predetermined position at all times, significant run-out being defined to be a deviation from such plane at the outer diameter of the rotor of greater than 0.0008 inches.

To achieve such precise alignment during extended use, a sealing material 24 is deposited between the interfacing-mounting surfaces 19, 20. The sealing material consists of a mineral oil based paste containing generally similar proportions of principle particles of nickel, graphite and hydrocarbon, such particles being suspended in the paste. "Base" is defined herein to mean a paste that has 51% or more by volume of the mineral oil. Nickel should preferably not be less than 15% by volume; graphite and the hydrocarbon each should preferably not be less than 10% by volume. The paste can contain small amount of lithium soap (3–5% by volume) and aluminum particles (1–3% by volume) to provide thermal conductivity.

The principle particles must have an particle size range of 5–80 microns so that under clamped pressure, micro movement of the interfacing surfaces is accommodated without extrusion or removal of the material 24 from between the surfaces; the material facilitate slipping of such particles within the paste without disturbing the integrity of the paste. Other compounds or solid lubricant particles can be added to the paste as long as the paste remains sufficiently fluidly viscous and the particles retain their ultra fine size characteristics. The paste preferably has the consistency of stiff tooth paste. The sealing material may contain other solid lubricants as a substitute for all or a portion of the graphite or nickel, the solid lubricants being selected from the group of $MoS_2$, BN, and lithium or sodium floride.

Figure 4:
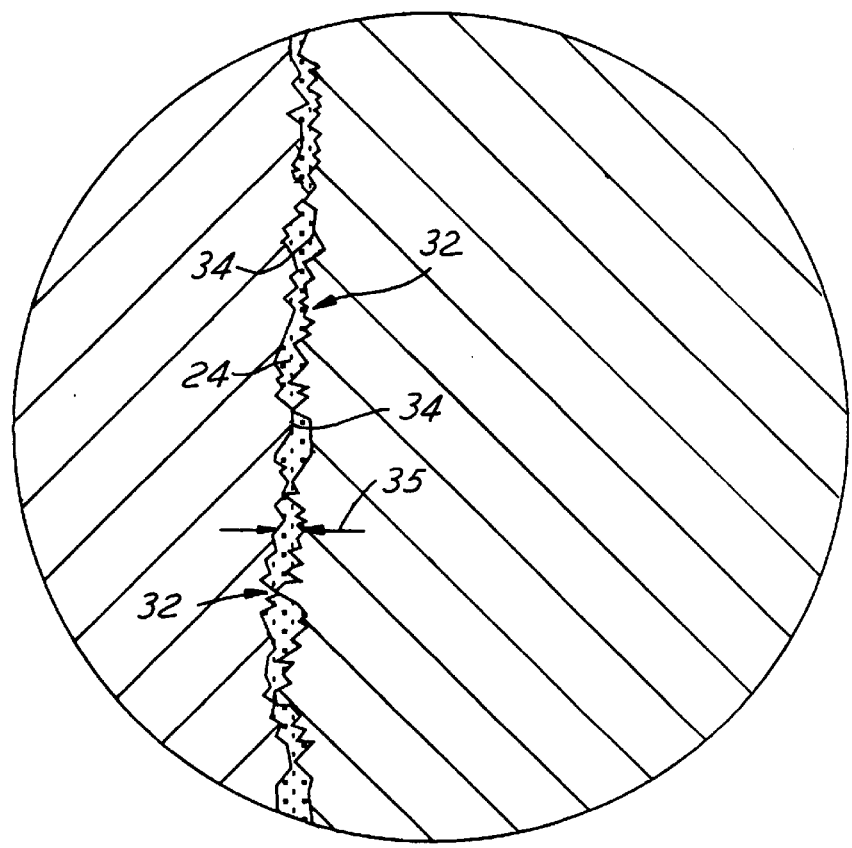
FIG. 4 is a greatly enlarged view of a portion circled in FIG. 3.
Figure 5:
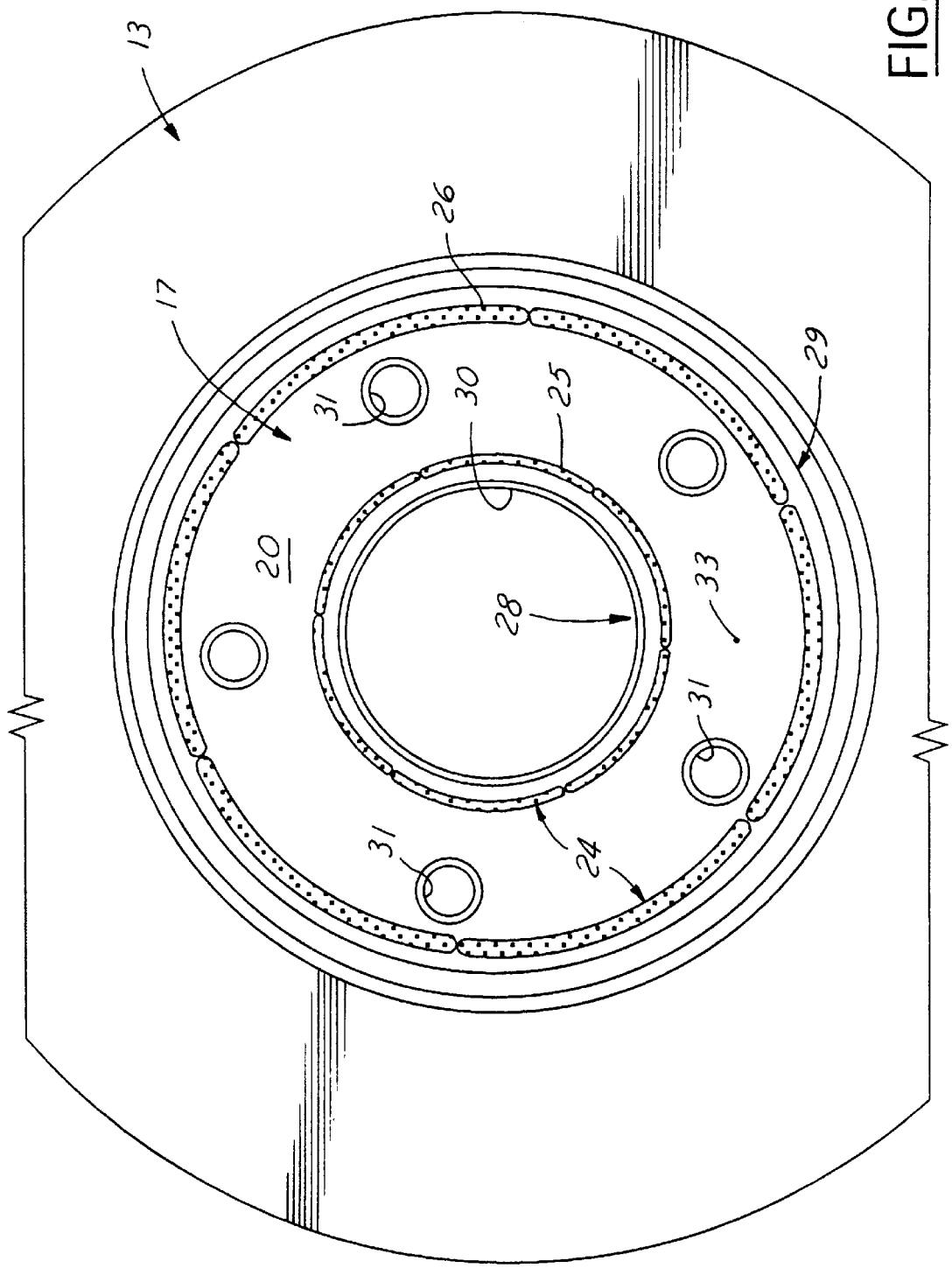
FIG. 5 is an enlarged elevational view of the rotor illustrating one pattern for depositing sealing material on the flange surface of the rotor hat section.
Figure 6A:
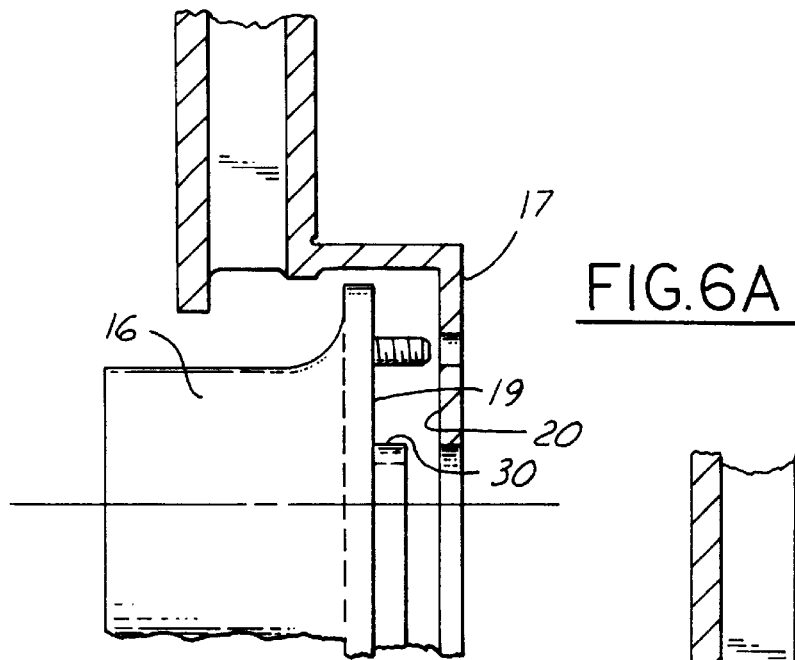
Figure 6B:
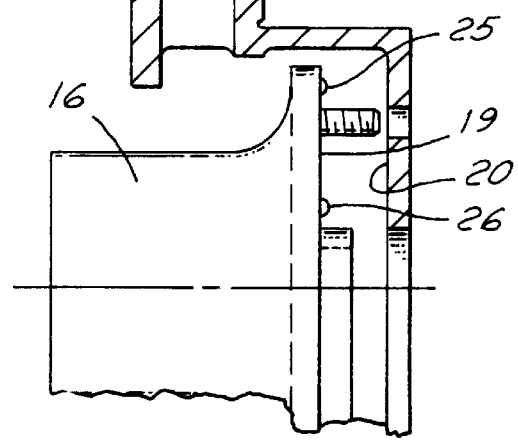
Figure 6C:
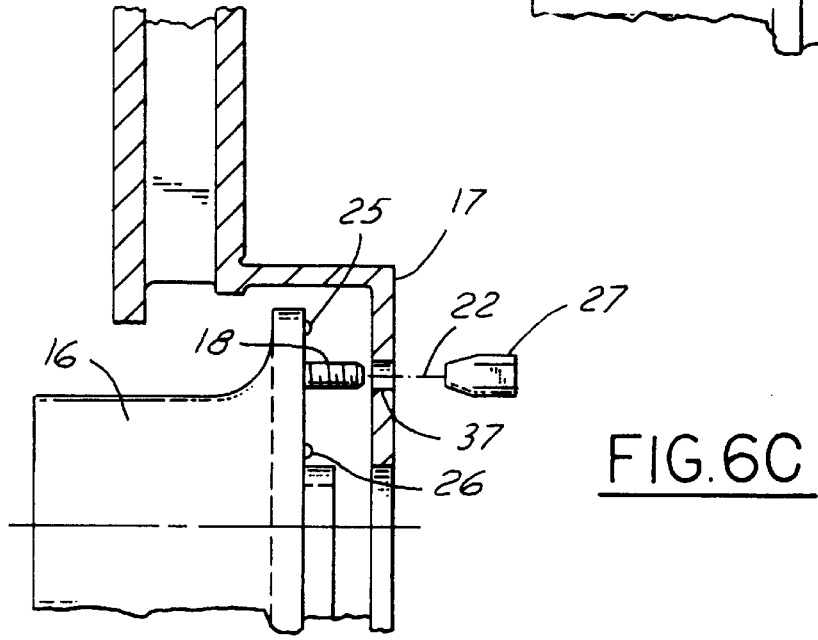

The paste is deposited, as shown in FIGS. 5–6, in a precisely limited volume to permit some metal to metal contact on a micro scale to exist between the interfacing surfaces when fully clamped (see schematic in FIG. 4 showing micro-ridge to micro-ridge contact at 32). This may be achieved by extruding (preferably by a robot) the paste in one or more annular bead rings 25, 26 onto at least one of the surfaces. If two bead rings are used, as shown, the cross sections of the bead rings should be uniform to provide an average of about 2.5 grams per rotor (2.1–3.0 g/rotor). The mating surfaces are clamped together by torquing bolts 27 on the threaded studs 18 that extend through openings 31 in flanges 16 and 17. The paste is spread under a coupling pressure of about 5,000–6,000 pounds to smear across the interfacing surfaces and migrate into the micro asperities of the machined surfaces, allowing the micro-peaks or ridges 34 of the machined surface variations to achieve metal to metal contact, with paste particles trapped therebetween; the tough stiff viscous nature of material 24 allows for micro shifting of the surfaces without wearing or fretting of the sealing material. The thickness 25 of the material, as spread or smeared on the surfaces, is squeezed down to about 0.0005 inches or less. In the embodiment of FIG. 5, environmental moisture cannot enter between the clamped interfacing surface 19, 20 through the inner or outer peripheries (28, 29) thereof. Use of bead rings, adjacent such peripheries as shown in FIG. 5 will, when the surfaces 19, 20 are clamped together, cause the material 24 to spread somewhat and seal such peripheries against water penetration. However, since the mid region 33 of the surfaces probably will not posses the material, even after spreading due to clamping, there is some risk that water vapor may migrate in this region or may enter through micro crevices about the stud (openings 3). Fretting corrosion may thus occur which is a limited spotty corrosion, but which corrosion is subject to micro-grinding (due to micro shifting of the clamped surfaces during braking cycles) allowing further corrosion to build up under the corrosion that has been disintegrated by the grinding.

Figure 7:
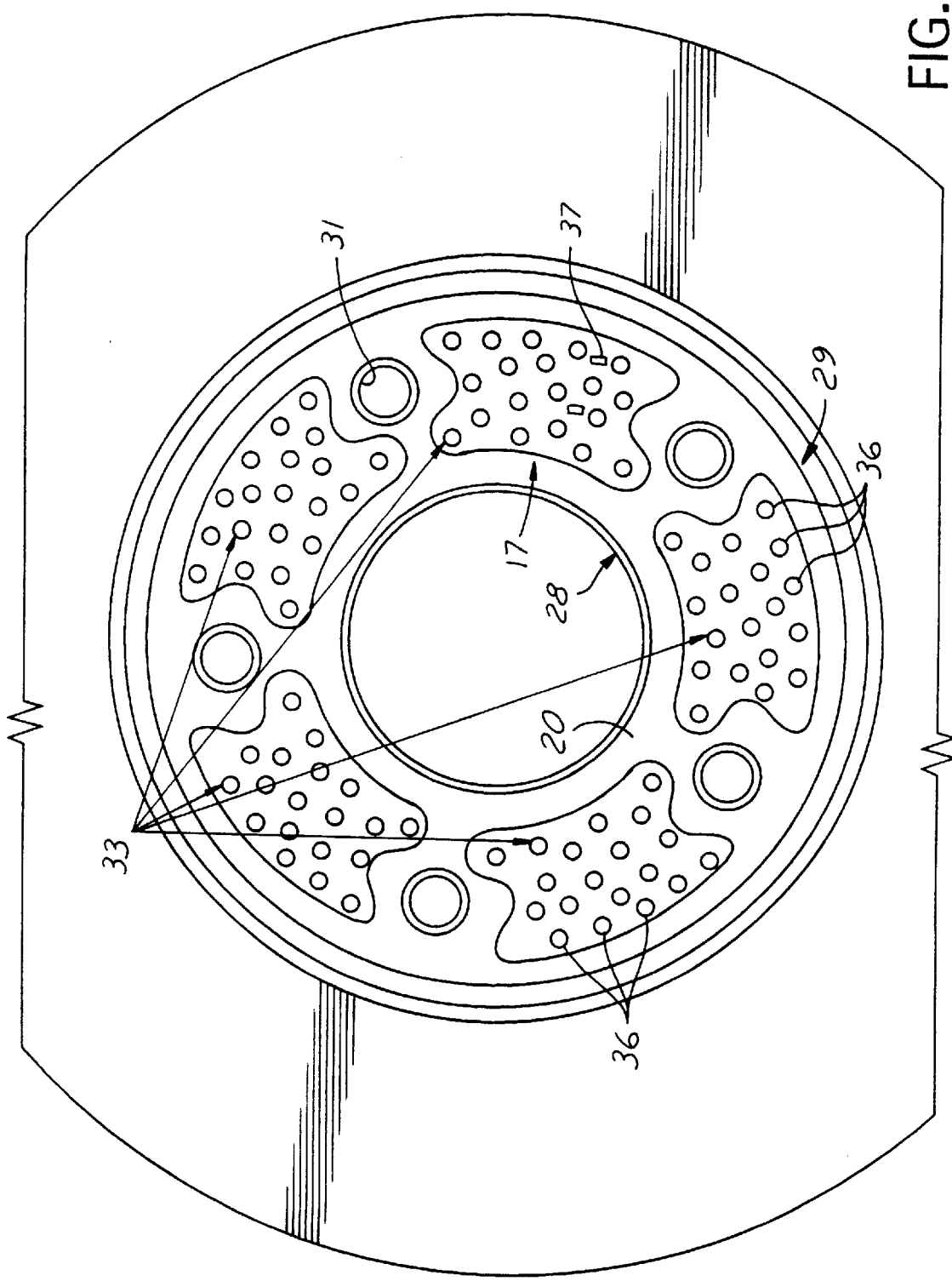
FIG. 7 is an enlarged elevational view of the rotor illustrating yet another alternative method of depositing the sealing material on the flange surface of the rotor hat section.

To remove the possibility of this type of corrosion, the material 24 may be alternatively dabbed, brushed on, or screen printed onto the interfacing surfaces in separated dots 36 or segmented ribbons 37, as shown in FIG. 7, to provide even greater volume and distribution control. Since the dots 36 or segments 37 are applied over a greater area of the interfacing surfaces, coupling pressure will spread material 24 more rigorously around each stud opening and across the entire mid-region 33. There, thus will be no opportunity for fretting corrosion to become established. An even more optimum manner of depositing may be to combine bead rings with screen printed closed-spaced dots to eliminate all forms of corrosion.

The reason the sealing material not only eliminates or inhibits corrosion, while remaining stiff but viscous to tolerate micro movements of the clamped interfacing surfaces, is that it seals out water and contamination, lubricating properties that avoids fretting, provides a barrier, and lasts through thermal cyclings, mechanical shifting, and centrifugal forces to remain malleable enough and assure metal-to-metal contact. The sealing material will not seize or gall up to temperatures as high as 2800° F. Other compounds or solid lubricants can be added to the sealing material composition provided the essential sealing and viscosity characteristics of the material at temperatures up to 1500° C. and under pressures up to 6,000 pounds are not affected.

The paste when newly deposited is a dark gray, while the machined steel interfaces are a bright metallic color before assembly. After assembly and disassembly after substantial vehicular use, the interfacing surfaces will have an overall, but very fine, blotchy appearance due to the distribution of the gray paste into the micro asperities of the bright steel. No corrosion is visible to affect such appearance and thus is not present as a contaminate. Such interfacing surfaces thus can be reassembled without addition of new sealing material and without concern that the alignment of the rotor to the spindle will be effected.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of mounting a brake rotor to a wheel hub having an axis of rotation, the mounting establishing a sealed but removable fixed bearing therebetween, comprising the steps of:
 (a) forming mating metallic mounting surfaces on said respective rotor and hub that extend in a plane essentially normal to said axis of rotation;
 (b) depositing a sealing material between said mounting surfaces consisting of a mineral oil based paste having generally similar proportions, by volume, of particles of nickel, graphite and hydrocarbon suspended in said paste, said particles having an ultra fine particle size range of 5–80 microns;
 (c) clamping said surfaces together to complete said mounting, said clamping causing said deposited material to spread uniformly therebetween to seal said surfaces against corrosion while reducing lateral run-out of said rotor, said paste being deposited in a limited volume to permit metal to metal contact between micro-ridges of said surfaces when clamped, said paste tolerating micro movements between said surfaces during extended use without fretting to maintain alignment of the rotor to said hub.

2. The method as in claim 1, in which the lateral run-out that is limited in step (c) is no greater than 0.0005 inches, said paste maintaining alignment of the rotor to the hub to maintain a stiff viscosity of said paste even up to temperatures as high as 2800° F.

3. The method as in claim 1, in which in step (a) said mounting surfaces are machined to a surface finish 30–60 micro inches.

4. The method as in claim 1, in which said mounting surfaces are annular flat rings and said sealing material has sufficient viscosity to be deposited by extrusion in narrow annular bead rings, spaced concentrically from each other, and the bead rings being deposited in a weight range of 2.1–4.0 grams per mounting surface.

5. The method as in claim 1, in which, in step (b), said sealing material additionally contains one or more of lithium soap and aluminum.

6. The method as in claim 1, in which, in step (d), said sealing material contains (i) nickel in an amount no less than 15% by volume, and (ii) graphite and a hydrocarbon each in a volume no less than 10%.

7. The method as in claim 1, in which, in step (c), said clamping is carried out with a load of 5,000 to 6,000 pounds.

8. The method as in claim 1, in which, in step (c), said deposited material resides between said clamped surfaces in a thickness of 0.0005 inches or less.

9. The method as in claim 1, in which, in step (b), said sealing material is deposited in a pattern of separated dots or segments to achieve said limited volume, which pattern permits metal to metal contact between said surfaces when clamped.

10. The method as in claim 9, in which said deposition is carried out by screen printing.

11. The method as in claim 1, in which, in step (d), said sealing material may contain solid lubricant as a substitute for all or a portion of the graphite or nickel, the solid lubricant being selected from the group of $MoS_2$, BN, and lithium or sodium fluoride.

12. The method as in claim 1, in which said clamped surfaces may be separated for disassembly of the wheel assembly and reassembled with the same clamping forces while retaining the same alignment of the rotor to the spindle.

\* \* \* \* \*